United States Patent [19]
Kosslowski et al.

[11] Patent Number: 5,459,633
[45] Date of Patent: Oct. 17, 1995

[54] INTERDIGITAL CAPACITOR AND METHOD FOR MAKING THE SAME

[75] Inventors: Stefan Kosslowski, Neu-Ulm; Ralf Bertenburg, Krefeld; Norbert H. L. Koster, Aldenhoven; Ingo Wolff, Aachen, all of Germany

[73] Assignee: Daimler-Benz AG, Stuttgart, Germany

[21] Appl. No.: 102,714

[22] Filed: Aug. 6, 1993

[30] Foreign Application Priority Data

Aug. 7, 1992 [DE] Germany ............................ 42 26 155.4

[51] Int. Cl.$^6$ ........................................ H01G 1/015
[52] U.S. Cl. .................... 361/304; 361/311; 361/326; 361/303; 233/246; 257/532
[58] Field of Search .................. 361/271, 301.1, 361/326, 303, 304, 311, 328, 330; 333/161, 204, 205, 246, 248, 24 C; 257/277, 522, 532

[56] References Cited

U.S. PATENT DOCUMENTS

| | | | |
|---|---|---|---|
| 2,751,558 | 6/1956 | Greig et al. | 333/204 |
| 2,758,256 | 8/1956 | Eisler | 361/271 |
| 3,085,052 | 4/1963 | Sibert . | |
| 3,673,516 | 6/1972 | Spanos | 333/24 C |
| 3,796,976 | 3/1974 | Heng et al. | 333/246 |
| 4,281,302 | 7/1981 | Stegens | 333/204 |
| 4,454,489 | 6/1984 | Donazzen et al. | 333/248 |
| 4,912,437 | 3/1990 | Kuokkanen | 333/246 |
| 5,194,833 | 3/1993 | Dougherty et al. | 333/246 |

FOREIGN PATENT DOCUMENTS

| | | | |
|---|---|---|---|
| 2225163 | 12/1972 | Germany . | |
| 62-30404 | 2/1987 | Japan | 333/204 |
| 63-104501 | 5/1988 | Japan | 333/204 |

OTHER PUBLICATIONS

R. Goyal, Monolithic Microwave Integrated Circuits: Technology & Design, Artech House, Inc. pp. 328–341, 1989.
Decoupling Capacitor Structure to Reduce Fat Output Driver Switching Noise, IBM Technical Disclosure Bulletin, vol. 30, No. 7, Dec. 1987, pp. 167–168.
Optimization of Interdigital Capacitors, John L. Hobdell, IEEE Transactions on Microwave Theory and Techniques, vol. MTT–27, No. 9, Sep. 1979, pp. 788–791.
Interdigital Capacitors and their Applications to Lumped–Element Microwave Integrated Circuits, Gary D. Alley, published in Microwave Integrated CIrcuits, J. Frey, Artech House, Inc., 1975, pp. 351–356.

Primary Examiner—Bruce A. Reynolds
Assistant Examiner—Gregory L. Mills
Attorney, Agent, or Firm—Spencer, Frank & Schneider

[57] ABSTRACT

The present invention relates to an interdigital capacitor and to a method for producing an interdigital capacitor having a finger structure of a coplanar stub line covered by an air bridge pocket for increasing the capacitance of the coplanar line. The air bridge pocket provides shielding for the capacitor structure. The disclosed manufacturing method includes producing a galvanic reinforcement of the center line of the coplanar line.

10 Claims, 5 Drawing Sheets

INTERDIGITAL CAPACITOR AND METHOD FOR MAKING THE SAME

BACKGROUND OF THE INVENTION

I. Technical Field

The present invention relates to an interdigital capacitor and to a method of producing an interdigital capacitor and, more particularly, to an interdigital capacitor having fingers alternately connected to a center line of a coplanar waveguide and a method for making the interdigital capacitor.

II. Related Art

Interdigital capacitors are used in monolithically intergrated microwave circuits (MMIC) as blocking capacitors or as low radiation, or emission, capacitors in filter structures and resonant circuits. Interdigital capacitors are known passive components for MMIC. See for example, J. Frey, Microwave Integrated Circuits, Artech House, Inc., 1975, page 351.

To optain capacitively loaded coplanar lines for MMICs for ultrahigh frequency and direct current networks, it is customary to use MIM (metal-insulator-metal) capacitors. See for example, Goyal, Monolithic Integrated Circuit Design, Artech House, 1989. Current supply for active components of MMICs in such a realization is effected by using a separate, high-ohmic stub line having a galvanically reinforced center line. To form the dielectric medium of the MIM capacitor, additional process steps are necessary during the MMIC manufacturing process. Moreover, problems arise with respect to the breakthrough voltage of the dielectric medium. Further, in order to avoid undesirable couplings when using MIM capacitors, a relatively large space must exist between the metal faces of the capacitor and critical conductor path structures. This has a detrimental effect on packing density and, consequently, on manufacturing costs of MMICs.

SUMMARY OF THE INVENTION

It is therefore on object of the present invention to provide a capacitor for a coplanar waveguide for MMICS suitable for a frequency range above 30 GHz which has a high breakthrough voltage and can be produced easily and inexpensively. It is another object of the invention to provide a method of manufacturing such a capacitor.

The above and other objects are accomplished according to the invention by the provision of an interdigital capacitor of present invention which includes a coplanar waveguide formed on a substrate and having a center line and a ground plane, a plurality of fingers alternatingly connected to the center line and the ground plane, and an air bridge pocket covering the plurality of fingers and having an opening toward the center line.

Preferably, the air bridge pocket is formed to have a height of about 3 µm above the plurality of fingers, while the plurality of fingers are each formed from a metal layer having a thickness of about 0.3 µm. The center line of the interdigital capacitor includes a galvanically reinforced metal layer having a thickness of about 3 µm. A dielectric medium can be formed in the air bridge pocket for obtaining a particular value of capacitance. Of course, a microwave integrated circuit can be formed using the interdigital capacitor of the present invention.

According to another aspect of the invention, there is provided a method for forming an interdigital capacitor, including the steps of forming a coplanar waveguide having a center line and a ground plane on a substrate; forming a plurality of fingers alternatingly connected to the center line and the ground plane; forming a photoresist layer on the plurality of fingers; forming a metal layer on the photoresist layer connected to the ground plane and removing the photoresist layer to form an air bridge pocket between the plurality of fingers and the metal layer.

Preferably the metal layer is galvanically deposited (electroplated) onto the photoresist layer. Advantageously the center line is reinforced galvanically simultaneously with forming the metal layer of the air bridge pocket. According to yet other aspects of the present invention, the air bridge pocket is formed simultaneously with an air bridge of at least on other component formed on the substrate, a dielectric medium can be formed in the air bridge pocket, and the air bridge pocket is opened toward the center line.

The covered interdigital capacitor (CIC) according to the present invention is employed to increase the capacitance of a coplanar line with respect to ground by covering the fingers of the stub line with an air bridge pocket. The air bridge pocket has the additional advantage that the capacitor structure is shielded against radiation from other circuit elements.

Another advantage is that the center line of the coplanar line structure is galvanically reinforced so that current required for setting an operating point of an associated active component can be effected without problems by way of the center line.

These and other objects, aspects and advantages of the present invention will be more fully understood by reference to the following detailed description taken in conjunction with the various figures and appended claims.

BRIEF DESCRIPTION OF THE DRAWINGS

The file of this patent contains at least one drawing executed in color.

DETAILED DESCRIPTION OF THE PREFERRED EMBODIMENT

The structure of the covered interdigital capacitor (CIC) according to the present invention in principle corresponds to that of a conventional interdigital capacitor whose fingers are alternatingly connected with the center line of the coplanar waveguide and the outer conductors acting as grounding surfaces. According to the present invention, the fingers are covered with an air bridge pocket during the same fabrication step forming air bridges for other components of coplanar circuits associated with the coplanar waveguide and using the same procedures as well known for forming air bridges. The air bridge pocket is open toward the center line while the other sides are closed and connected to ground plane. One embodiment of a covered interdigital capacitor according to the present invention will now be described.

Figure 1:
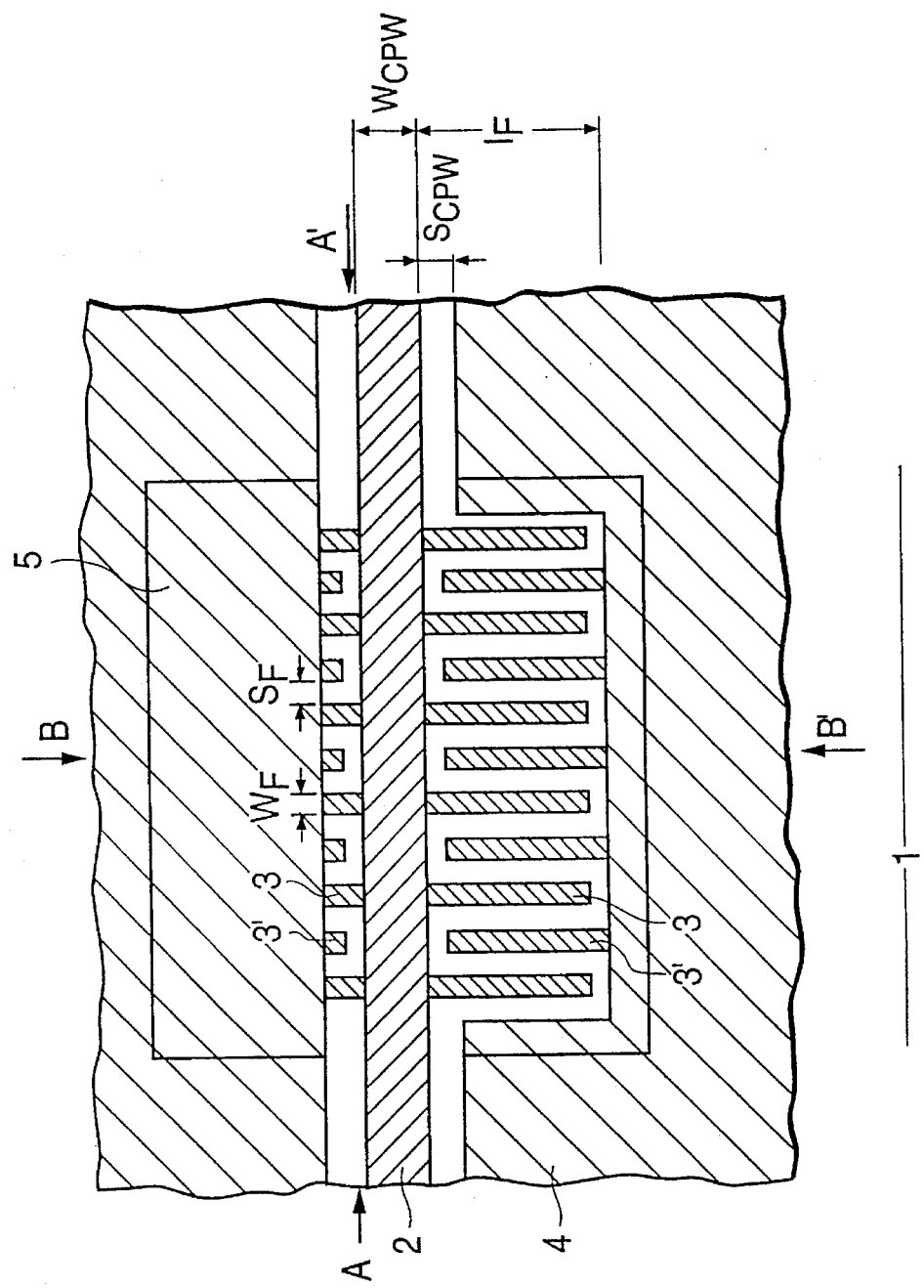
FIG. 1 shows an embodiment of a covered interdigital capacitor according to the present invention.

FIG. 1 shows a conductor structure for an interdigital capacitor 1 applied onto a GaAs substrate. The arrangement is symmetrical with respect to the center line. For the purpose of explaining, the metal layer of the air bride pocket covering the finger array is removed in the lower half of FIG. 1. Capacitor 1 has a center line 2 and a plurality of fingers 3, 3', for example, 50 fingers, forming an interdigital array.

The conductor structure is initially an evaporated gold layer with an additional chromium layer as an adhesion promoter. Fingers 3, 3' are alternately connected with center line 1 and outer conductor 4, such as a ground plane in such a way that fingers 3' are connected to the center line and fingers 3' are connected to ground plane. The width of the fingers is, for example, $w_F=2$ µm; the length of the fingers is, for example, $l_F=70$ µm; and the slot width of the fingers is, for example, $s_F=2$ µm. The width of the center line is, for example, $w_{CPW}=15$ µm, and the slot width of the coplanar waveguide is, for example, $s_{CPW}=10$ µm. The metalization height of the fingers is, for example, $t_F=0.3$ µm.

To produce an air bridge pocket, fingers 3, 3' are covered with photo-resist about 3 µm thick. The entire submetalization of the conductor structure and the photoresis layer are galvanically reinforced, for example, with gold to form a metal layer of about 3 µm thickness. Then, the photoresist is removed and the remaining metal layer forms an air bridge pocket 5 above the finger structure having a height of about 3 µm, equal to the thickness of the photoresist layer. The galvanically reinforced center line has a thickness equal to the thickness of the metal layer of the air bridge pocket.

Figure 2:
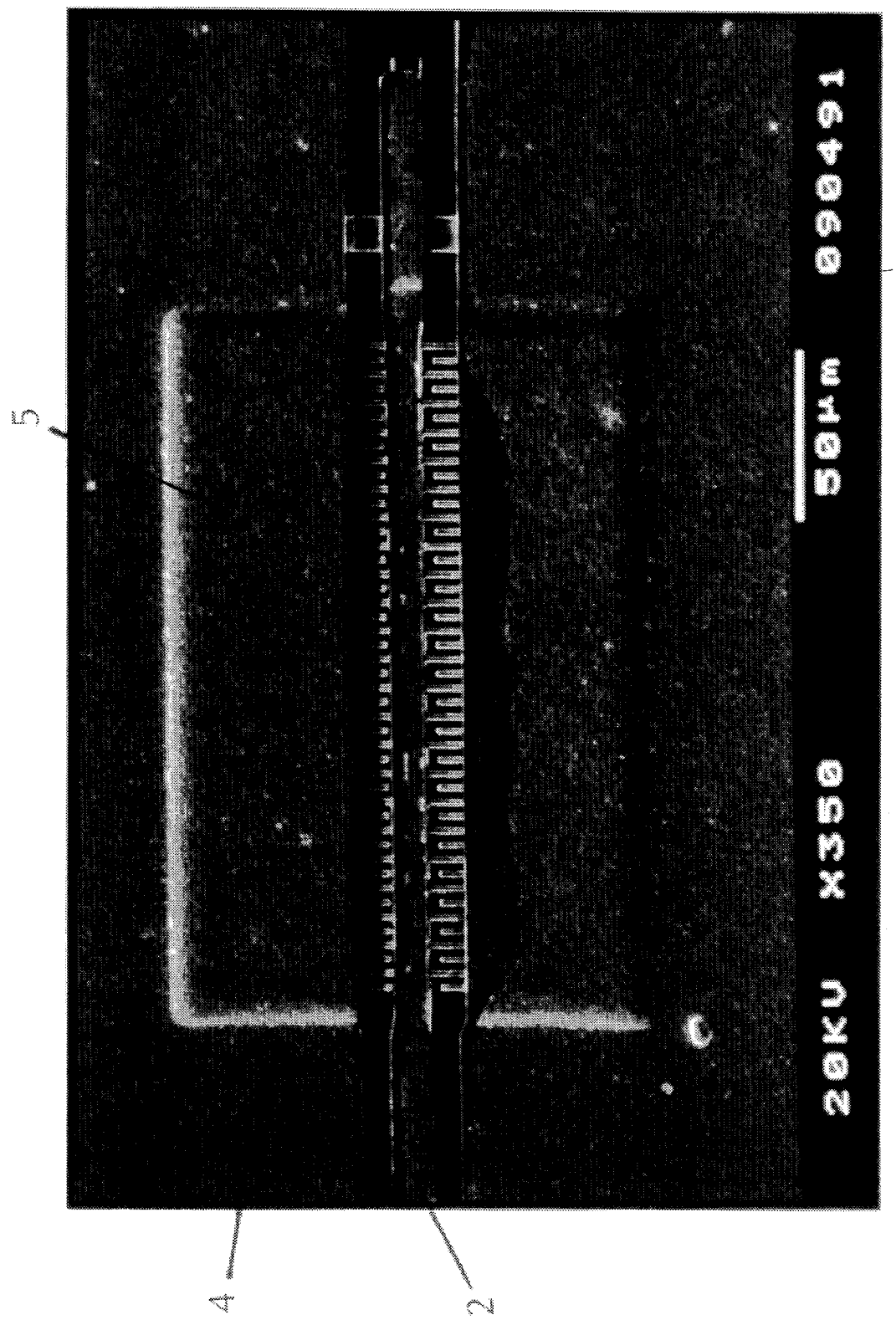
FIG. 2 is a top view onto a fabricated covered interdigital capacitor.

The photograph of a covered interdigital capacitor in FIG. 2 as realized in a microwave integrated circuit illustrates the absolute and relative dimensions of such a capacitor. On the right hand side of the capacitor structure an air bridge line crossing can be seen.

Figure 3:
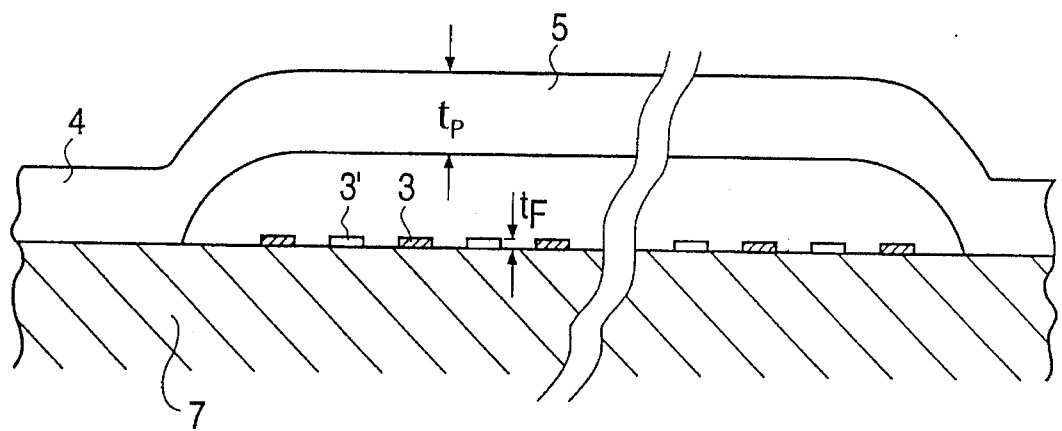
FIG. 3 shows a cross sectional view of a capacitor along line AA' of FIG. 1.
Figure 4:
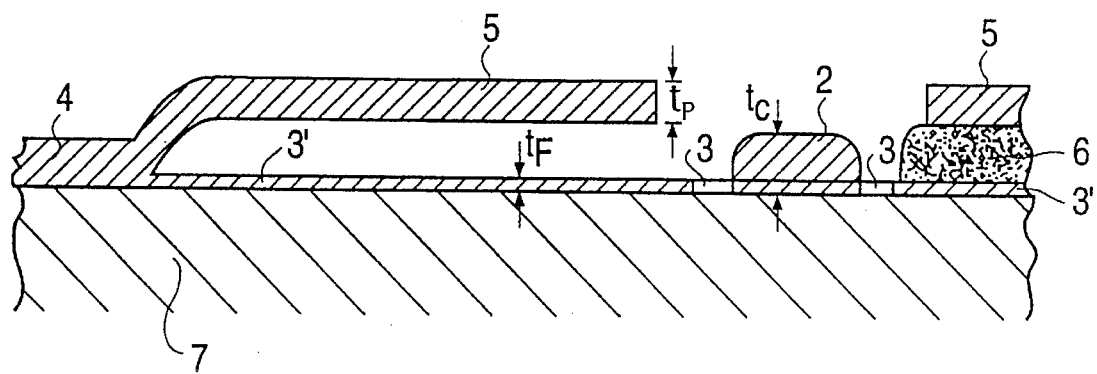
FIG. 4 shows a cross sectional view of a capacitor along line BB' of FIG. 1.

From the cross sectional views in FIG. 3 and FIG. 4 it can be seen that the air bridge pocket 5 covering the fingers 3, 3' is closed on three sides, where it is connected to the ground plane 4, and has an opening toward the center line. The thickness $t_p$ of the metal layer of the air bridge pocket 5 is about equal to the thickness $t_c$ of the center line and the thickness of the ground plane layer due to the simultaneous deposition of these layers. In the right half of FIG. 4 there is indicated an alternative embodiment with a solid dielectric medium 6 in the bridge pocket 5. The structure is arranged on a dielectric substrate 7. The relative dimensions in FIGS. 3 and 4 are not in correct scale.

Figure 5:
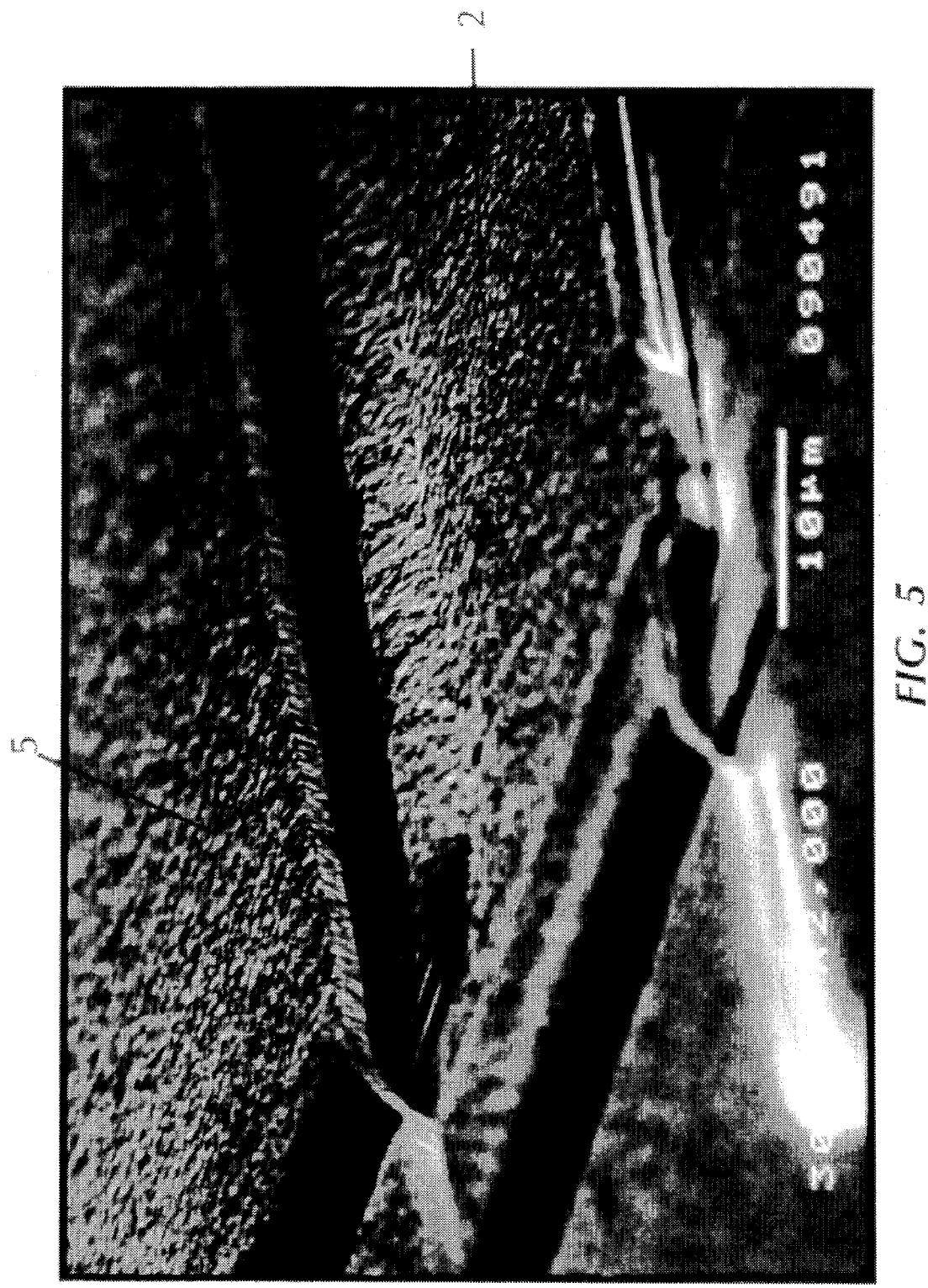
FIG. 5 is a view into an air bridge pocket of a covered interdigital capacitor.

The perspective view of FIG. 5 offers a look into an air bridge pocket of a capacitor according to the invention. Several of the fingers can be distinguished. The broad band in the fore ground starting from the lower left to the upper right of the figure is the center line of the capacitor forming an air bridge above a narrow crossing line in the lower left.

The fabrication of a covered interdigital capacitor makes use of fabrication steps that are well known to those skilled in the art and are commonly used in making air bridges in microwave integrated circuits. These well known fabrication steps including, for example, evaporating a metal layer an a substrate, galvanically reinforcing (electroplating) a metal layer, spinning on a photoresist layer, masking it and exposing it to light, etching the exposed parts etc., are thus not discussed here in detail.

The present invention is not limited to the materials mentioned in connection with the embodiment, but can also be transferred to circuits produced, for example, in Si or InP technology. The dimensions of the interdigital capacitor may also be selectively varied depending on the desired circuit to be performed.

When an increase in capacitance and not breakthrough voltage is of primary concern, the bridge pocket can be advantageously filled with a solid dielectric medium instead of air, for example, with $Si_3N_4$ (silicon nitride) or $SiO_2$ (silicon oxide). This is accomplished by depositing a layer of the dielectric medium on the finger structure and depositing the metal layer forming the bridge pocket on this dielectric layer. Preferably the dielectric medium is the same as used to cover components of an integrated circuit such as semiconductor devices with a passivating layer and the deposition of the dielectric layer on the finger structure occurs simultaneously with the deposition of the passivating layer.

Covered interdigital capacitors formed this way can be employed in integrated microwave circuits as blocking capacitors, in filter structures or in resonant circuits and offer primarily the advantages of inexpensive fabrication, high packing density, high capacitance and low radiation.

Figure 6:
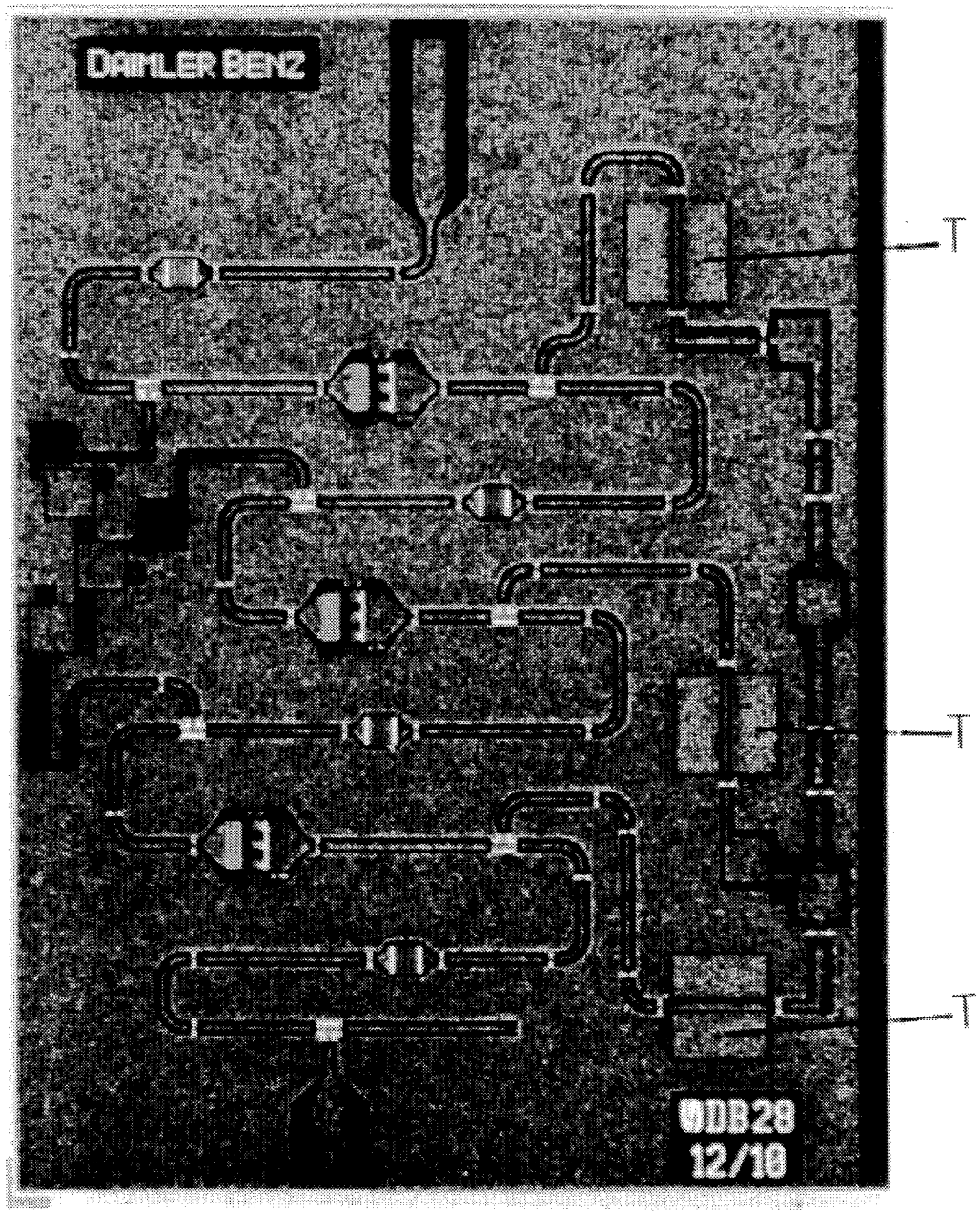
FIG. 6 depicts an integrated microwave circuit in which, for example, three covered interdigital capacitors according to the present invention are employed.

The circuit illustrated in FIG. 6, produced using coplanar waveguide technique includes, for example, three covered interdigital capacitors T according to the present invention.

Additional modifications and changes may be made to the single embodiment of the present invention disclosed, however, the invention is not limited to the specific details set forth. Accordingly, modification may be made without departing from the spirit or scope of the concept of the present invention as defined by the appended claims and their equivalents.

What is claimed is:

1. An interdigital capacitor comprising:
   a coplanar waveguide formed on a substrate and having a center line and a ground plane;
   a plurality of fingers alternatingly connected to the center line and the ground plane; and
   an air bridge forming an air bridge pocket covering the plurality of fingers and having an opening toward the center line.

2. An interdigital capacitor according to claim 1, wherein the air bridge pocket has a height above the plurality of fingers of about 3 µm.

3. An interdigital capacitor according to claim 1, wherein the plurality of fingers consists of a metal layer having a thickness of about 0.3 µm.

4. An interdigital capacitor according to claim 1, wherein the center line includes a galvanically reinforced metal layer having a thickness of about 3 µm.

5. An interdigital capacitor according to claim 1, further comprising a solid dielectric medium in the bridge pocket.

6. A microwave integrated circuit including an interdigital capacitor, the capacitor comprising
   a coplanar waveguide formed on a substrate and having a center line an a ground plane;
   a plurality of fingers alternatingly connected to the center line and the ground plane; and
   an air bridge forming an air bridge pocket covering the plurality of fingers and having an opening toward the center line.

7. A microwave integrated circuit including an interdigital capacitor according to claim 6, wherein the air bridge pocket has a height above the plurality of fingers of about 3 µm.

8. A microwave integrated circuit including an interdigital capacitor according to claim 6, wherein the plurality of fingers each have a metal layer having a thickness of about 0.3 μm.

9. A microwave integrated circuit including an interdigital capacitor according to claim 6, wherein the center line includes a galvanically reinforced metal layer having a thickness of about 3 μm.

10. A microwave integrated circuit including an interdigital capacitor according to claim 6, further comprising a solid dielectric medium in the bridge pocket.

* * * * *